(12) United States Patent
Faivre

(10) Patent No.: US 10,300,917 B2
(45) Date of Patent: May 28, 2019

(54) SYSTEM AND METHOD FOR AUTOMATICALLY ADJUSTING A TARGET GROUND SPEED OF A MACHINE

(71) Applicant: Caterpillar Inc., Peoria, IL (US)

(72) Inventor: Joseph Faivre, Edelstein, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 14/919,871

(22) Filed: Oct. 22, 2015

(65) Prior Publication Data

US 2017/0113697 A1    Apr. 27, 2017

(51) Int. Cl.
*B60W 30/18* (2012.01)
*B60W 40/105* (2012.01)
*E02F 3/84* (2006.01)
*E02F 9/20* (2006.01)

(52) U.S. Cl.
CPC .... *B60W 30/18172* (2013.01); *B60W 40/105* (2013.01); *E02F 3/841* (2013.01); *E02F 9/2029* (2013.01)

(58) Field of Classification Search
CPC ...................... B60W 30/18172; B60W 40/105
See application file for complete search history.

(56) References Cited

U.S. PATENT DOCUMENTS

| | | | | |
|---|---|---|---|---|
| 4,423,785 A | * | 1/1984 | Kurihara | B23Q 15/12 172/3 |
| 4,518,044 A | * | 5/1985 | Wiegardt | A01B 63/1117 172/3 |
| 4,535,847 A | * | 8/1985 | Hasegawa | A01B 63/1117 172/2 |
| 4,630,685 A | * | 12/1986 | Huck, Jr. | E02F 3/845 172/2 |
| 4,986,377 A | * | 1/1991 | Moriarty | B60K 17/348 180/6.5 |
| 5,297,649 A | * | 3/1994 | Yamamoto | E02F 9/2246 172/3 |
| 6,119,786 A | * | 9/2000 | Creger | A01B 63/1115 172/7 |
| 6,595,898 B2 | * | 7/2003 | Kobayashi | B60W 10/02 477/110 |
| 7,246,001 B2 | * | 7/2007 | Anderson | B60K 31/04 180/179 |
| 7,637,845 B2 | * | 12/2009 | Strashny | B60K 31/04 477/108 |

(Continued)

FOREIGN PATENT DOCUMENTS

WO    2014085165    5/2014

*Primary Examiner* — Thomas E Worden
(74) *Attorney, Agent, or Firm* — Bookoff McAndrews

(57) ABSTRACT

A method for automatically adjusting a target ground speed of a machine includes receiving data from a sensor, at a work monitor unit of an electronic control module of the machine, analyzing the data received from the sensor on the work monitor unit, receiving the data from the work monitor unit at a target model unit of the electronic control module, calculating, at the target model unit based on the data, ground engagement data for the machine, receiving the ground engagement data for the machine at a work monitor library unit of the electronic control module, calculating, at the work monitor library unit, the target ground speed, and adjusting a speed of the machine to the target ground speed.

16 Claims, 8 Drawing Sheets

(56) References Cited

U.S. PATENT DOCUMENTS

| | | | | |
|---|---|---|---|---|
| 8,538,645 | B2* | 9/2013 | Anderson | B60W 10/06 |
| | | | | 477/11 |
| 8,965,640 | B2* | 2/2015 | Faivre | G07C 5/00 |
| | | | | 340/439 |
| 9,005,081 | B2* | 4/2015 | Anderson | B60W 10/06 |
| | | | | 477/110 |
| 2007/0181318 | A1* | 8/2007 | Laudick | E02F 3/6481 |
| | | | | 172/810 |
| 2007/0219693 | A1* | 9/2007 | Stratton | E02F 3/844 |
| | | | | 701/50 |
| 2011/0040458 | A1* | 2/2011 | Nakagawa | F02D 29/00 |
| | | | | 701/50 |
| 2011/0153170 | A1* | 6/2011 | Dishman | E02F 3/844 |
| | | | | 701/50 |
| 2014/0156105 | A1* | 6/2014 | Faivre | G07C 5/00 |
| | | | | 701/1 |
| 2014/0156152 | A1* | 6/2014 | Faivre | G05D 1/00 |
| | | | | 701/50 |
| 2014/0156153 | A1* | 6/2014 | Faivre | G07C 5/0841 |
| | | | | 701/50 |
| 2014/0156155 | A1* | 6/2014 | Faivre | B60W 30/18036 |
| | | | | 701/60 |
| 2014/0156162 | A1* | 6/2014 | Faivre | B60W 50/0098 |
| | | | | 701/84 |
| 2014/0336881 | A1* | 11/2014 | Clar | E02F 9/2045 |
| | | | | 701/50 |
| 2015/0134103 | A1* | 5/2015 | Tsuda | G05B 19/4103 |
| | | | | 700/182 |
| 2015/0204901 | A1* | 7/2015 | Faivre | G01S 19/25 |
| | | | | 702/96 |
| 2015/0361640 | A1* | 12/2015 | Faivre | E02F 3/844 |
| | | | | 701/50 |
| 2016/0282857 | A1* | 9/2016 | DeVore | E02F 9/262 |

* cited by examiner

SYSTEM AND METHOD FOR AUTOMATICALLY ADJUSTING A TARGET GROUND SPEED OF A MACHINE

TECHNICAL FIELD

This disclosure relates to a system and method for automatically adjusting a target ground speed of a machine.

BACKGROUND

A system on some machines, such as a track-type tractor machine, may maintain a constant speed of the machine by adjustment of an implement, such as a blade, and hence an adjustment of the load experienced by the implement. For example, adjusting an implement may include raising or lowering the implement. As more force is applied to the implement of the machine, ground engaging members of the machine such as tracks may slip, meaning the machine's track speed is not equal to its actual ground speed. For example, a drawbar holding the implement on some machines may experience increased force. Subsequently the tracks of the machine may slip. In such a case, the system may adjust the implement, such as by raising the blade, to reduce the load on the machine to maintain the desired speed and to reduce slip of the ground engaging members.

Often times, such as when the machine pushes a material, it is of interest to the operator to slow the machine. In this regard, the use of a deceleration control, such as a deceleration pedal, may limit engine speed, thereby reducing the speed of the machine. However, the above-noted system may determine that the machine is being slowed by the load on the implement and may raise the implement undesirably.

U.S. Patent Application Publication Number 2011/0040458A1, titled "Working vehicle engine output control system and method," discloses an engine output control system which can compute a speed ratio of the torque converter and reduce an output torque of the engine without changing the target speed of the engine. However, this Application does not automatically adjust the target speed of the machine to maintain the load applied to the machine.

Accordingly, a system and method are needed to automatically adjust the target speed of the machine and maintain the load on the implement even when a deceleration control is applied.

SUMMARY

In one aspect, a method for automatically adjusting a target ground speed of a machine includes receiving data from a sensor, at a work monitor unit of an electronic control module of the machine, analyzing the data received from the sensor on the work monitor unit, receiving the data from the work monitor unit at a target model unit of the electronic control module, calculating, at the target model unit based on the data, ground engagement data for the machine, receiving the ground engagement data for the machine at a work monitor library unit of the electronic control module, calculating, at the work monitor library unit, the target ground speed, and adjusting a speed of the machine to the target ground speed.

In another aspect, a system for automatically adjusting a target ground speed of a machine includes an electronic control module having a processor and a memory to store machine units, a deceleration control to provide a deceleration command to one of the machine units, and the machine units to determine, with the processor and based on the deceleration command, a target track pull, a target track speed, and a blade position.

DETAILED DESCRIPTION

Figure 1:
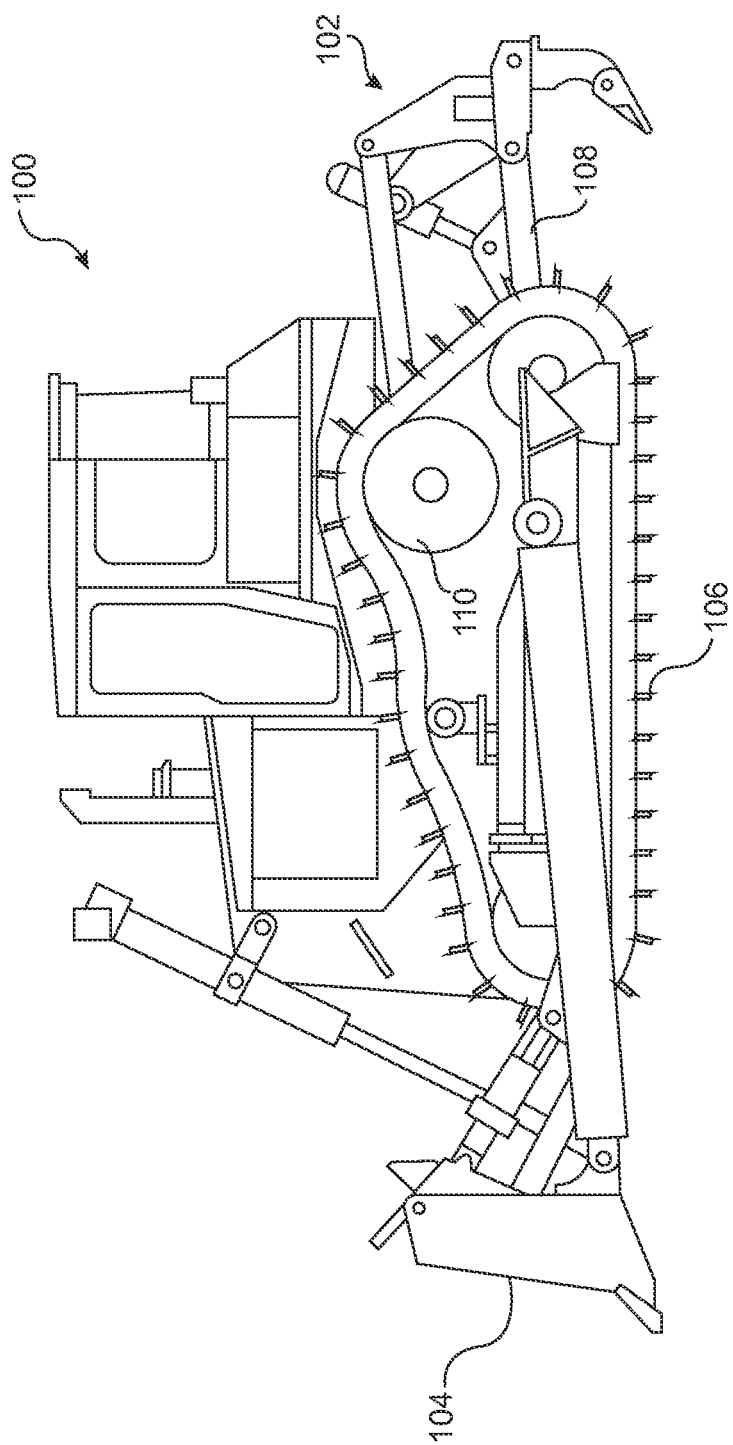
FIG. 1 illustrates an exemplary machine according to the disclosure.

FIG. 1 illustrates an exemplary aspect of the machine according to the disclosure. In particular, FIG. 1 illustrates an exemplary view of a machine 100, which may be a track type tractor or the like. The machine 100 may have a drive transmission and a torque converter that may utilize certain aspects of the disclosure. The machine 100 may have rear work implements 102 for performing operations. The machine 100 may also have additional work implements for performing operations such as a blade 104, tracks 106, a ripper lift arm 108, a machine drivetrain 110, and the like. While the machine 100 may use a mechanical drive transmission in one aspect of the present disclosure, the machine 100 may alternatively utilize a hydrostatic drive/steer system or an electric drive that may also utilize certain aspects of the disclosure.

Drawbar pull as used in the present disclosure refers to the force delivered to the tracks 106. This force may be expended primarily by moving the machine 100, e.g., pushing a load, and by moving material under the tracks 106 in the form of track slip. Other force may be expended via friction losses and may be accounted for in drawbar pull. Conversely, energy diverted for other purposes such as air conditioning may be outside drawbar pull calculations, but may affect overall operation of the machine 100.

Figure 2:
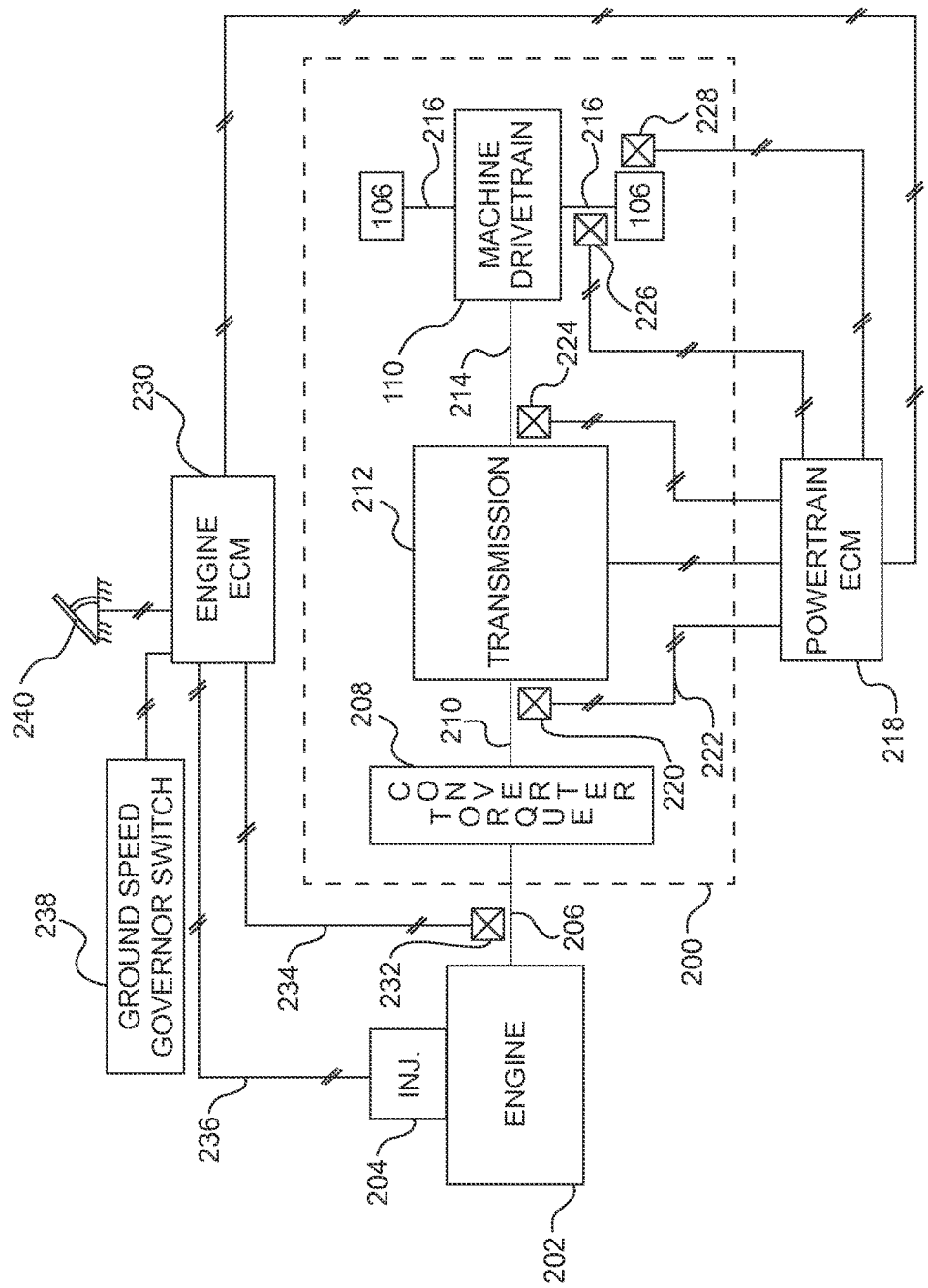
FIG. 2 illustrates a schematic of machine drivetrain system of the machine of FIG. 1 according to the disclosure.

FIG. 2 illustrates a schematic of the machine drivetrain 110 of the machine 100 of FIG. 1. The machine 100 may have a powertrain 200 and an engine 202, which may include a fuel supply system 204, such as an injector (INJ shown in FIG. 2) or the like, used to control the amount of fuel delivered to the engine 202. The engine 202 may also have an engine output shaft 206 connected to a torque converter 208 and may be configured for providing a variable output speed and torque to the torque converter 208. The torque converter 208 may include a torque converter output shaft 210 connected to a transmission 212 and may be configured for rotating at a variable speed and for delivering torque to the transmission 212. The torque converter 208 may have an impeller which is mechanically driven by a prime mover, a turbine to drive the load, and a stator to facilitate oil flow between the turbine and the impeller. The torque converter 208 may also have a lock-up clutch which, when mechanically engaged, may link the impeller and turbine. The transmission 212 may include a transmission output shaft 214 connected to the machine drivetrain 110. The machine drivetrain 110 in the present disclosure may have a drive axle 216 that rotates the tracks 106 of the machine 100, but is not limited in the present disclosure to being connected to an axle that drives a pair of tracks. Alternatively, the powertrain 200 may utilize a hydrostatic drive/steer system or an electric drive that may also utilize certain aspects of the disclosure.

A powertrain electronic controller module (PECM) 218 may be provided to control the operation of the powertrain 200 with one or more units, algorithms, and/or models stored on and executed by the PECM 218. The PECM 218 may include a microprocessor, which may include one or more microcomputers, integrated circuits and the like, configured for being programmed and for executing modules and algorithms to control the operation of the machine 100. A torque converter output shaft sensor 220 may be operatively connected to the PECM 218 and may produce a torque converter output speed signal 222 indicative of the rotational speed of the torque converter output shaft 210, which may be proportional to the track speed of the machine 100. Alternatively, any one of a plurality of sensors may be operatively connected to the PECM 218. The sensors may include a transmission output sensor 224 for measuring the rotational output speed of the transmission output shaft 214, an axle speed sensor 226 for measuring the rotational speed of the drive axle 216, and an engine speed sensor 232 for measuring the actual engine speed of the machine 100, a speed sensor for measuring another speed, or any like sensor configured for producing a signal that is proportional to the track speed of the machine 100.

An engine electronic controller module (EECM) 230 may be provided to control the operation of the engine 202. The EECM 230 may include one or more units, algorithms, and models to control the operation of the engine 202. The EECM 230 may include a microprocessor, which may include one or more microcomputers, integrated circuits and the like, configured for being programmed and for executing modules and algorithms to control the operation of the machine 100. The EECM 230 may be operatively connected to the fuel supply system 204 for controlling the amount to fuel being delivered to the engine 202. Alternatively, any one of a plurality of sensors may be operatively connected to the EECM 230.

The EECM 230 may receive the engine output speed signal 234 and the torque converter output speed signal 222 from the PECM 218, and may calculate a torque converter speed ratio, which may be a torque converter output speed divided by engine output speed. The EECM 230 may include a unit and/or an algorithm for calculating a desired engine RPM and for delivering a modulated fuel signal to the fuel supply system 204.

The EECM 230 may increase or decrease fueling based on load. As load increases, engine speed will drop and fueling may increase, resulting in increased engine torque, but not increased speed. Because engine speed and machine speed are driven by a load on the machine 100, controlling the machine speed requires controlling machine load, which may require adjusting an implement on the machine 100. The load may come from material on the front of the blade 104, for example, or other forces applied to the machine 100. Raising the blade 104 will typically decrease load and increase speed, and lowering the blade 104 will typically have the opposite effect. Therefore, engine speed and machine speed can be adjusted by changing the load applied to the machine 100.

The system may calculate a target load, track speed, and ground speed with the EECM 230 and/or PECM 218. Under normal (e.g., non-deceleration) conditions, the system may raise and lower the blade 104 to control the machine 100 at this speed. A ground speed sensor 228 is used to drive a controller error signal for the PECM 218. The ground speed sensor 228 is typically a location (e.g., GPS, Galileo, Glonass, and the like) receiver, but could be a ground speed radar or other device.

Under deceleration conditions, the operator expects a load to be maintained and speed to decrease, so the system may need to determine a new target speed that maintains the load under the decelerated conditions. Deceleration results in less power, and less power with a constant load results in a lower speed.

In an aspect of the present disclosure, the ground speed is the track speed adjusted for slippage, as any slippage would reduce the ground speed. Alternatively, other calculations may be made using any one of the aforementioned sensors to produce desired engine RPMs. The system in FIG. 2 may also be controlled by a ground speed governor switch 238. The ground speed governor switch 238 may be operatively connected to the EECM 230 to activate a ground speed governor, which may be an asynchronous governor. For exemplary purposes, the machine 100 may limit the maximum RPMs of the engine 202 through a plurality of variable parameters. One such parameter may utilize the asynchronous governor to limit the maximum RPMs. This limit may be hard-coded into the logic of the EECM 230. Another parameter may implement a deceleration control 240 for the operator to engage. The deceleration control 240 may be implemented as a pedal. Other implementations are contemplated as well. For example, implementing the deceleration control 240 throughout its range of motion may produce a proportional decrease in engine RPMs. In addition, when the deceleration control 240 is engaged, the machine 100 may use the system illustrated in FIG. 2, in particular the PECM 218 and/or the EECM 230, to adjust a target speed of the machine 100 and to maintain a target load. If an excessive load would cause slippage of the tracks 106 beyond a predetermined threshold, for example 14%, the system in FIG. 2 may automatically raise the blade 104 and thereby reduce the load on the machine 100. In addition, the system may reduce the machine's load to reduce the risk of stalling if the deceleration from the deceleration control 240 limits torque below a value required to maintain a non-decelerated load and to continue moving the machine 100.

A deceleration command caused by the deceleration control 240 may also impose a maximum engine speed constraint. Due to the torque converter 208, however, the engine speed and the machine speed may not be proportionate. As load increases, the torque converter's torque ratio increases and the speed ratio decreases, rendering the output torque greater than the engine torque, but the output speed less than engine speed. Thus, when considering the target speed against the maximum engine speed constraint, the system must also consider the target load and use both the target speed and target load to determine a target engine speed. If the target engine speed is less than the deceleration limit, the system may continue operating at the machine speed target. If the target engine speed is greater than the deceleration limit, the engine 202 may no longer have enough power to produce the required torque to maintain the load and propel the machine 100 at the target vehicle speed, so the system must reduce the speed of the machine 100. Below a certain engine speed, however, the torque converter 208 may not absorb enough power to maintain the blade load and move the tracks 106, so the system may also reduce the blade load by, for example, raising the blade 104.

Alternatively, the use of one electronic control module (ECM), which may be the PECM 218, the EECM 230, the like, or a combination thereof, may be used to control both the powertrain 200 and the engine 202. The ECM may have one or more processors and a memory for storing units, algorithms, and modules to operate the machine 100. The ECM may receive a plurality of signals including but not limited to the engine output speed signal 234, the torque converter output speed signal 222, the transmission output sensor 224, the axle speed sensor 226, and the ground speed sensor 228 or any like sensor configured for producing a signal that is proportional to the ground speed of the machine 100 and the like. Furthermore, the ECM may be configured for storing various data, such as a table of predetermined torque converter performance data, material properties data, gear and drag models, drawbar pull curves, power limits, soil models, and the like. The ECM may also be configured for calculating the torque converter speed ratios and engine RPMs. Furthermore, the ECM may control the fuel supply system 204 and may receive additional data from one or more sensors. The operation of the machine 100 by the ECM may be based at least in part on the data received by the sensors.

The operation of the machine 100 may be based on three different speeds: the speed of the engine 202, the speed of the tracks 106, and a ground speed. The speed of the tracks 106 may be inferred from a transmission input or output speed. The ground speed may also differ from the speed of the tracks 106 due to slippage. In addition, the speed of the engine 202 may not be the same as the transmission input speed due to slippage of the torque converter 208. These speeds are discussed in more detail in relation to FIG. 5.

Figure 3:
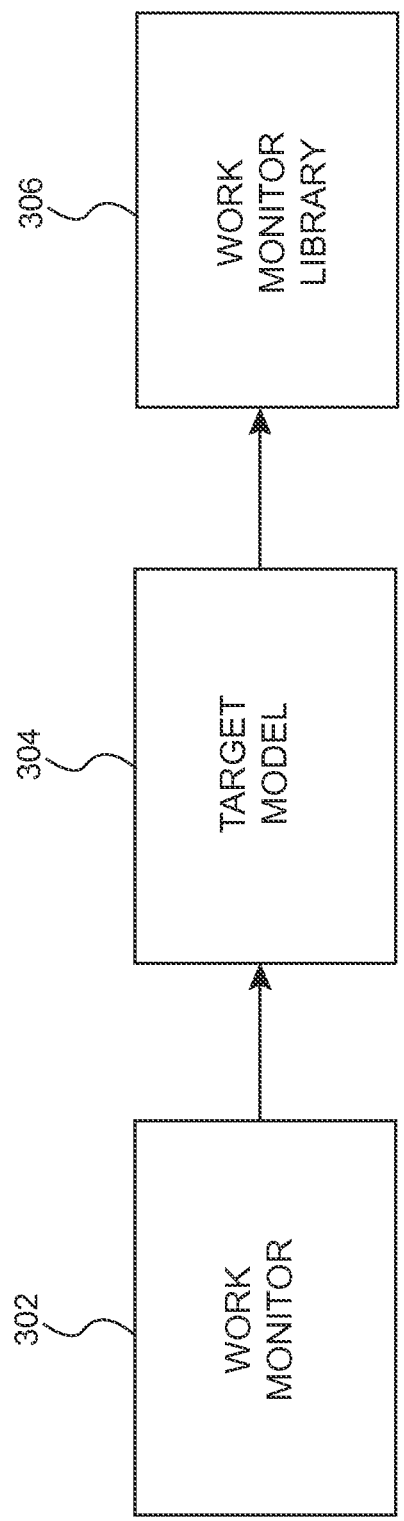
FIG. 3 illustrates a system for automatically adjusting a speed of the machine of FIG. 1 by using the system of FIG. 2, according to the disclosure.

FIG. 3 illustrates a system for automatically adjusting the speed of the machine 100 and may be implemented with the system of FIG. 2. The system may include units such as a work monitor unit 302, a target model unit 304, and a work monitor library unit 306, and the like, each of which may be stored on the ECM memory and executed by the ECM processor, or may alternatively be units separate from the ECM capable of transmitting, generating, and calculating data. Each of the units may have one or more algorithms and models stored thereon to control operation of the machine 100, and may have one or more processors to perform calculations, receive and generate data, and the like. The work monitor unit 302, target model unit 304, and work monitor library unit 306 components may cause the elements of the powertrain 200 to perform specific functions and to implement specific parameters.

For example, the work monitor unit 302 may estimate and analyze material properties of the terrain on which the machine 100 is working and may optimize the performance of the machine 100 based on those material properties and a variety of tables and equations for the engine and converter parameters to determine target outputs such as track pull and track speed for the machine 100. The target model unit 304 may make adjustments to the target outputs based on operator constraints (e.g., a deceleration command) and a variety of tables and equations for the engine and torque converter parameters. The work monitor library unit 306 may consider the adjusted target outputs and the material properties to determine, based on estimated track slippage at the adjusted target outputs and estimated material properties, the target ground speed for the machine 100.

Figure 4:
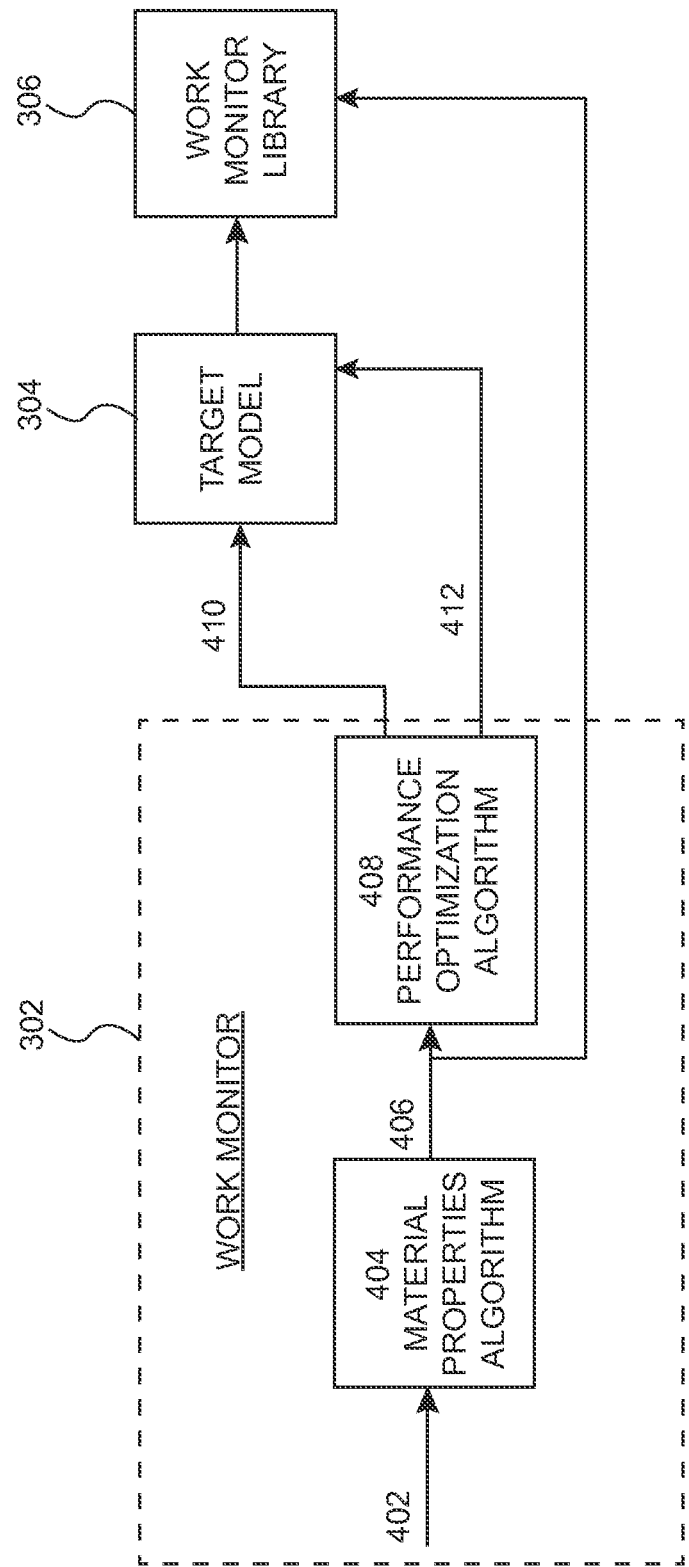
FIG. 4 illustrates an exemplary box diagram representing a method performed by the work module according to FIG. 3.

FIG. 4 illustrates an exemplary box diagram representing a method performed by the work monitor unit 302. The work monitor unit 302 may receive sensor data 402 from the sensors in the system of FIG. 2. The sensor data 402 may include information related to the surface on which the machine 100 is operating and information regarding the performance of the machine 100. A material properties algorithm unit 404 may receive and use the sensor data 402 and may consider the type of surface on which the machine 100 is operating to estimate material properties 406, which may include a coefficient of traction (COT) for that surface, a shear modulus adjustment, slope, side slope, temperature, and the like. The material properties 406 may therefore relate to the properties of the surface on which the machine 100 is operating.

The work monitor unit 302 may also determine, with a performance optimization algorithm unit 408, an optimal performance of the machine 100 based on the material properties 406 and a variety of tables and equations for the engine and torque converter parameters. Optimal performance parameters may include a target track speed, a target ground speed and a target track pull based on the material properties 406 and a variety of tables and equations for the engine and torque converter parameters. The optimal performance may represent the track speed, ground speed and track pull of the machine 100 with track slippage at a particular range or value. The track pull and the track speed with a particular track slippage may represent the raw target track pull 410 and the raw target track speed 412. For example, the performance optimization algorithm unit 408 may calculate the raw target track pull 410 and the corresponding raw target track speed 412 based on the material properties 406 associated with the surface materials with which the machine 100 is interacting.

The target model unit 304 may receive a variety of inputs, some of which may be received from the work monitor unit 302, including the raw target track pull 410 and the raw target track speed 412. The work monitor unit 302 may also output data, including the material properties 406, to the work monitor library unit 306.

Figure 5:
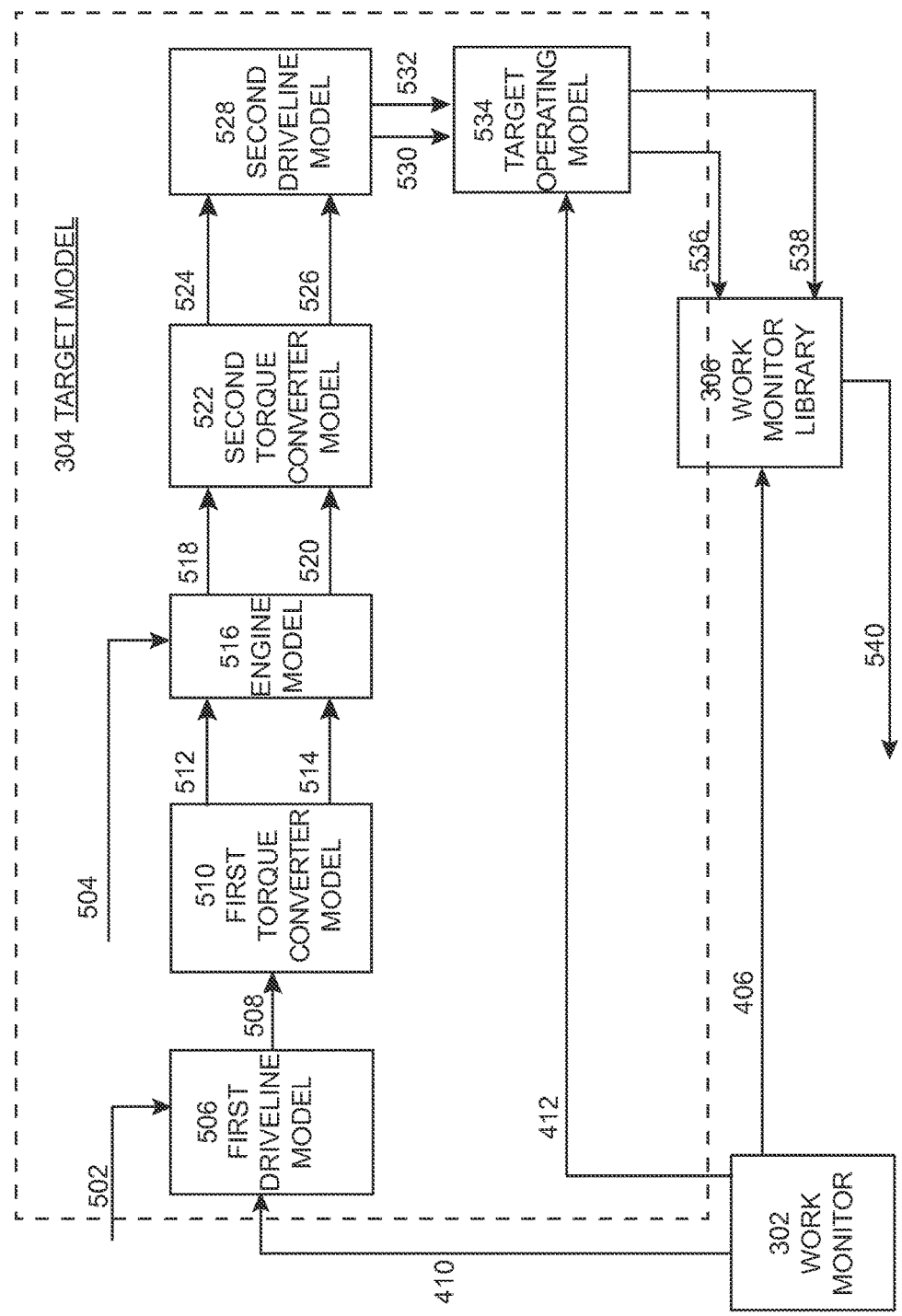
FIG. 5 illustrates an exemplary box diagram representing a method performed by the target model according to FIG. 3.

FIG. 5 illustrates an exemplary box diagram representing a method performed by the target model unit 304. The target model unit 304 may receive inputs such as the raw target track pull 410, the raw target track speed 412, gear information 502, a deceleration command 504, and the like, and may determine ground engagement data as described herein. The ground engagement data may include track data such as speed, slippage, and the like.

The gear information 502 may include a gear ratio and the like. For example, the gear ratio may represent the number of output gear teeth to the number of input gear teeth in a gear train. The deceleration command 504 may include deceleration speed offsets, which may occur when the engine speed is limited by the deceleration control 240. In addition, the deceleration control 240 may introduce a positive feedback loop in the system. In one aspect of the disclosure, the deceleration command 504 may be filtered, thus may add a lag time to the various calculations of the target model unit 304.

The target model unit 304 may input the raw target track pull 410 and the gear information 502 into a first driveline model unit 506 which may calculate a converter output torque 508, which may be a driveline input torque. The driveline may generally include the components of the powertrain 200, including the transmission 212. The first driveline model unit 506 may be a mathematical model representing the mechanical behavior of the actual driveline. To determine the converter output torque 508 with the first driveline model unit 506, the gear information 502 may include pitch information and/or transmission data and the like. The gear information 502 may be used as a product with the raw target track pull 410 on the machine 100 to determine the converter output torque 508, which represents the torque of the torque converter 208. The first driveline model unit 506 may transmit the converter output torque 508 to a first torque converter model unit 510.

Based on the converter output torque 508, the first torque converter model unit 510 may determine a table of torque converter input speed and torque converter input torque representing a curve of constant track pull 512 equivalent to the raw target track pull 410, and a table of torque converter input speed and input torque representing maximum torque converter absorption curve 514. The constant track pull curve 512 may be assumed to be a measurement of engine speed to derated engine torque. Derated engine torque is a torque that is limited relative to the normal torque. The maximum torque converter absorption curve 514 may be generated by assuming a torque converter speed ratio of zero at various torque converter input speeds. The maximum torque converter absorption curve 514 may measure the derated torque of the engine 202 against the speed of the engine 202.

An engine model unit 516 may include various tables of data or mathematical equations modeling the derated torque of the engine 202 against the speed of the engine 202, and may receive the constant track pull curve 512 and the maximum torque converter absorption curve 514 from the first torque converter model unit 510, and the deceleration command 504 (which may include a maximum desired engine speed) from the deceleration control 240. The engine model unit 516 may determine and output an engine torque 518 and an engine speed 520 based on inputs such as a maximum converter torque, another converter torque, a net lug torque (e.g., torque of the engine 202 as a function of speed), and the like. The various torque inputs can be used to determine a net torque of the engine 202, which may be analyzed with an engine curve showing the engine lug, a line of constant drawbar pull, the maximum torque converter absorption curve 514, and the like. For example, the net engine torque 518 may take the minimum value from among a value of the maximum torque converter absorption curve 514, a value from a constant drawbar pull curve, and a value from a net lug curve.

In one aspect of the disclosure, when the machine 100 is under a blade load and the engine 202 is reduced to a lugged speed due to the ECM adjusting the RPMs of the engine 202, the engine speed limit due to deceleration control 240 may be greater than the lugged speed. In such a case, the machine 100 may be lugged to a lower speed than the decelerator limit, and the system will not need to adjust the raw target speed and load. In another aspect the engine speed limit caused by the deceleration control 240 may be less than lugged engine speed due to the load on the machine 100. In this aspect the engine 202 may be controlled to the limited engine speed range and the described system may adjust its target machine speed range where the machine 100 can maintain a target drawbar pull by reducing track speed. At this speed range, the deceleration control 240 may cause the machine 100 to reduce speed but attempt to maintain the blade load at full throttle. The machine speed may be reduced up until a certain point below which the torque converter 208 may not absorb enough power to maintain the blade load and move the tracks 106. Thus, the engine torque 518 may depend on those variables and curves.

The engine torque 518 and engine speed 520 may be received by a second torque converter model unit 522, which may determine and output another converter torque 524 and a converter speed 526. The converter torque 524 may be the same as or different from the converter output torque 508, and may be determined by converting the engine speed 520 and engine torque 518 to converter output speed and output torque using known torque converter performance tables and/or a series of mathematical calculations which model the physical behavior of the torque converter 208. The converter speed 526 may be calculated by multiplying the engine speed 520 with a speed ratio based on the pump torque. The second torque converter model unit 522 may output the converter torque 524 and converter speed 526 to a second driveline model unit 528.

The second driveline model unit 528 may determine a force applied to the machine 100 based on torque, efficiency, and the like. The force may be the track pull 530, which may be the current track pull. For example, the force may be a product of the converter torque 524, driveline efficiency, and gear reduction ratios based on pitch and gear information. The second driveline model unit 528 may also determine the track speed 532 based on pitch and gear information, and may output the track pull 530 and the track speed 532 to the target operating model unit 534. For example, the track speed 532 may be a product of the converter velocity and a reduction ratio, which may be determined based in part on pitch and gear information. The track pull 530 may be the actual track pull at the current time, and the track speed 532 may be the actual track speed at the current time, or may be an adjusted track pull and adjusted track speed. The adjusted track pull and adjusted track speed variables may be based in part on driveline efficiency, track pitch, gear ratio, and the like.

The track pull 530 and track speed 532 may be received by and input into the target operating model unit 534 along with the raw target track speed 412 provided by the work monitor unit 302. The target operating model unit 534 may determine the target track pull 536 and the target track speed 538 to apply to the machine 100. The target model unit 304 may transmit the target track pull 536 and the target track speed 538 to the work monitor library unit 306. The work monitor library unit 306, as discussed below, may determine the target ground speed 540. For example, if the target track speed 538 is less than or equal to the raw target track speed 412, the system may adopt the target track speed 538 for the machine 100. If the target track speed 538 is greater than the raw target track speed 412, however, the ECM may adopt the raw target track speed 412.

Figure 6:
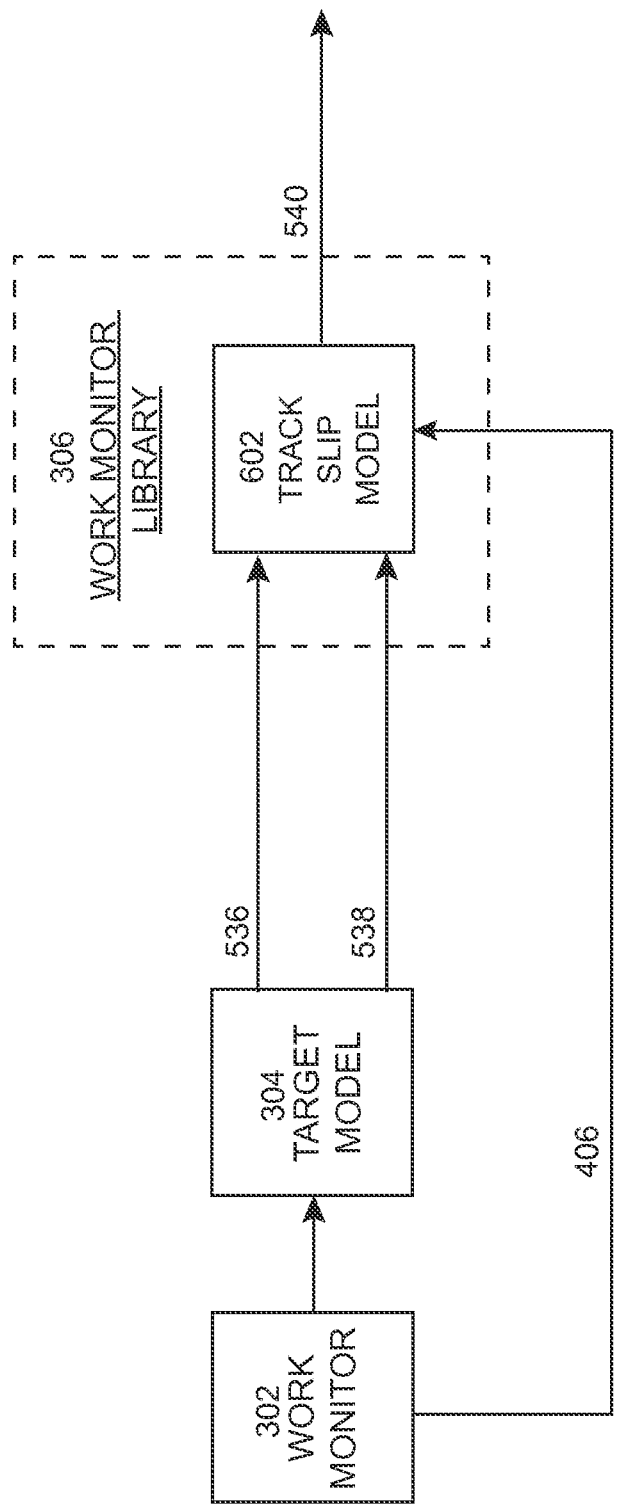
FIG. 6 illustrates an exemplary box diagram representing a method performed by a unit according to the disclosure.

FIG. 6 illustrates an exemplary box diagram representing a method performed by the work monitor library unit 306. The target track pull 536 and target track speed 538 may be received by and input into the work monitor library unit 306, which may have a track slip model unit 602. The track slip model unit 602 may calculate, based on the target track pull 536, the target track speed 538, and the material properties 406 from the work monitor unit 302, the target ground speed 540 for the machine 100.

Figure 7:
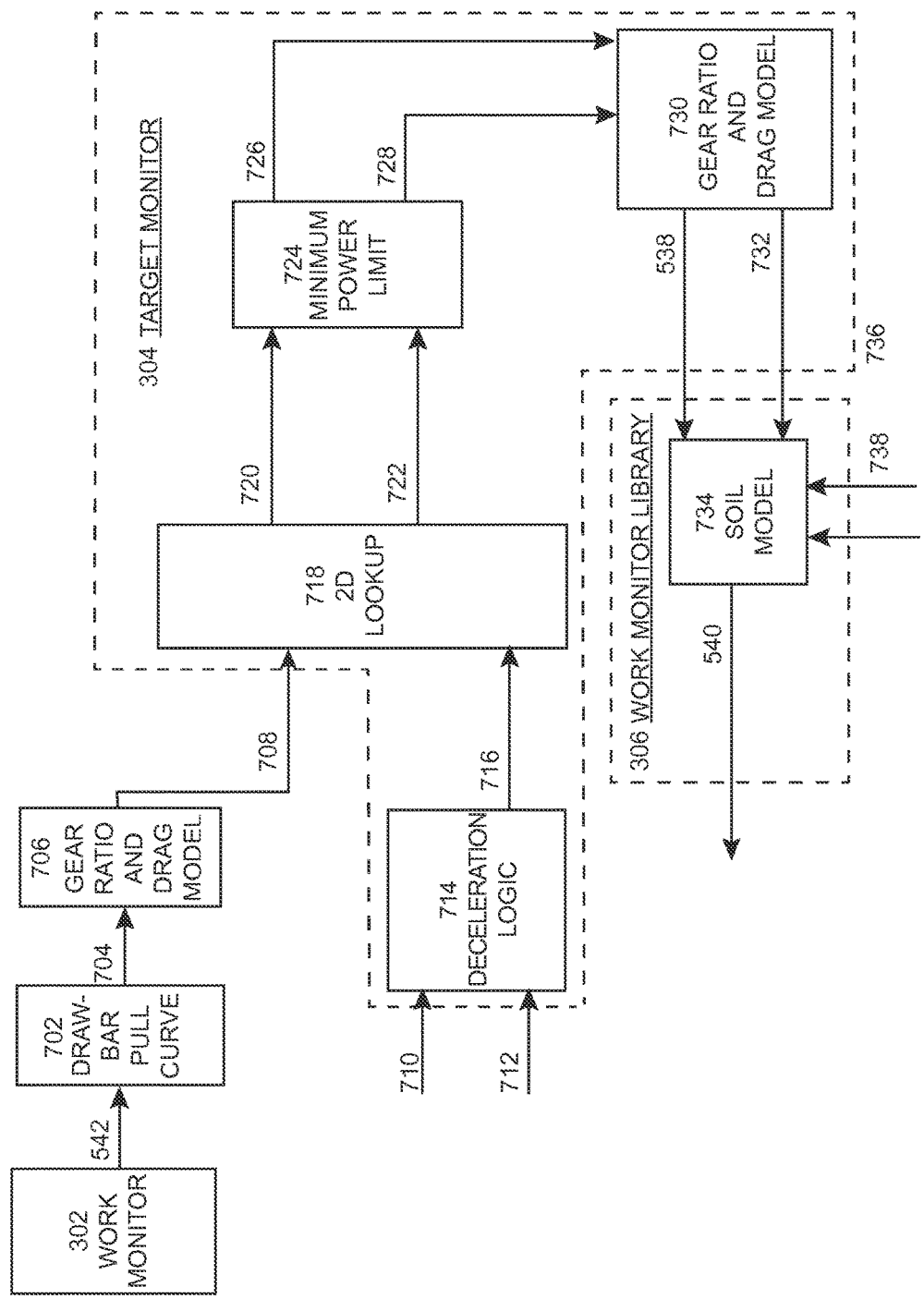
FIG. 7 illustrates another exemplary box diagram representing a method according to the disclosure.

FIG. 7 illustrates another exemplary box diagram representing a method performed by a unit. In this alternative aspect, the target track speed 538 may be input into a drawbar pull curve 702. The drawbar pull curve 702 may help determine the target track drawbar pull 704 based on the drawbar pull at full throttle. The target track drawbar pull 704 may be received by and input into a gear ratio and drag model unit 706, which may determine a target torque converter torque 708. A deceleration position 710 and a throttle position 712 may be received by and input into deceleration logic 714 to determine an engine speed limit 716. The target torque converter torque 708 and the engine speed limit 716 may be input into a lookup table 718, which may help determine a target torque converter speed 720 and a target torque converter torque 722 to be input into a unit imposing a minimum power limit 724. The minimum power limit 724 may be implemented to generate another target torque converter speed 726 and another target torque converter torque 728 based at least in part on a power limit imposed on the machine 100.

The target torque converter speed 726 and the target torque converter torque 728 may be received by and input into a gear ratio and drag model unit 730 to determine the target track speed 538 and a target drawbar load 732 to implement on the machine 100. The target track speed 538 and a target drawbar load 732 may be received by input into a soil model unit 734 in the work monitor library unit 306. The soil model unit 734 may also account for a shear model unit 736 and the COT 738 in order to determine the target ground speed 540.

In one aspect of the present disclosure, the data received by the sensors may correspond to a ground slope on which the machine 100 is currently working and on one or more of a track velocity, a ground speed, a drawbar pull, and the COT 738. Producing the COT 738 includes calculating a plurality of instantaneous pull-weight ratios using the drawbar pull and the slope, removing from the plurality of instantaneous pull-weight ratios the instantaneous pull-weight ratios that fail to meet a first screening criteria, the first screening criteria including removing the instantaneous pull-weight ratios corresponding to a predetermined slip value, and averaging the instantaneous pull-weight ratios that meet the first screening criteria to produce the COT 738. The method of producing the COT 738 may also include normalizing, at the ECM, a nominal pull-slip curve by the COT 738 to produce a normalized pull-slip curve, and producing, at the ECM, the shear modulus adjustment factor. Producing the shear modulus adjustment factor includes calculating a plurality of normalized pull-weight ratio values, removing normalized pull-weight ratio values that fail to meet a second screening criteria, the second screening criteria including removing the normalized pull-weight ratio values corresponding to a slip outside a predetermined range, calculating the shear modulus adjustment factor from the normalized pull-weight ratio values meeting the second screening criteria, applying the shear modulus adjustment factor to the normalized pull-slip curve to obtain an adjusted pull-slip curve, and using the adjusted pull-slip curve, the COT 738, and the slope to determine optimum performance parameters. The method may further include using the optimum performance parameters to adjust an operating state of the machine 100 to achieve a performance closer to the optimum performance.

INDUSTRIAL APPLICABILITY

The disclosure is applicable to a machine 100, such as a track-type tractor machine, with speed control systems in general, and specifically to automatically adjusting the speed of the machine 100 having a deceleration control 240. When the deceleration control 240 is engaged, the engine speed of the machine 100 may be limited, which could in turn reduce the speed of the machine 100. Instead of reducing the speed of the machine 100, a system on board the machine 100 may raise the blade 104 to reduce the load on the machine 100.

Referring to FIGS. 1 and 2, as the machine 100 pushes more material, drawbar force increases and the track speed reduces. As the drawbar force increases, the tracks 106 may shear material at a higher rate and slip more. The system illustrated in FIG. 2, in particular the ECM, may adjust the load of the blade 104 to maintain a desired ground speed and slip when the drawbar force increases. Application of the deceleration control 240, however, limits engine speed and machine speed. The one or more ECMs in FIG. 2 may implement the units responsible for the calculations shown in FIGS. 3-6, or alternatively the units may be external from the ECM.

Referring to FIGS. 2-6, the system of FIG. 2, using the ECM and the units, may determine a target track pull 536 and a target track speed 538 to be fed into the work monitor library unit 306, which may determine the target ground speed 540 for the machine 100. The system of FIG. 2 may use one or more ECMs having the work monitor unit 302, the target model unit 304, and the work monitor library unit 306 stored thereon.

The work monitor unit 302 may use a material properties algorithm unit 404 and a performance optimization algorithm unit 408 to determine variables such as the raw target track pull 410 and the raw target track speed 412. Those variables may be determined at least in part by the sensor data 402.

The target model unit 304 may receive the raw target track speed 412 and the raw target track pull 410, among other inputs, and may calculate a variety of torque and speed variables using a first driveline model unit 506, a first torque converter model unit 510, an engine model unit 516, a second torque converter model unit 522, a second driveline model unit 528, and a target operating model unit 534. The outputs of the target operating model unit 534 may include the target track pull 536 and the target track speed 538.

The work monitor library unit 306 may receive the target track pull 536 and the target track speed 538 and may input them into the track slip model unit 602. The track slip model unit 602 may also consider the material properties 406 from the work monitor unit 302 to determine the target ground speed 540. The system of FIG. 2, controlled by the ECM, may then adjust the speed of the machine 100 to the target ground speed 540. Each of the units; models, algorithms, libraries, and the like may be executed in one or more modules of the ECM or may exist and/or perform operations separately from the ECM.

Figure 8:
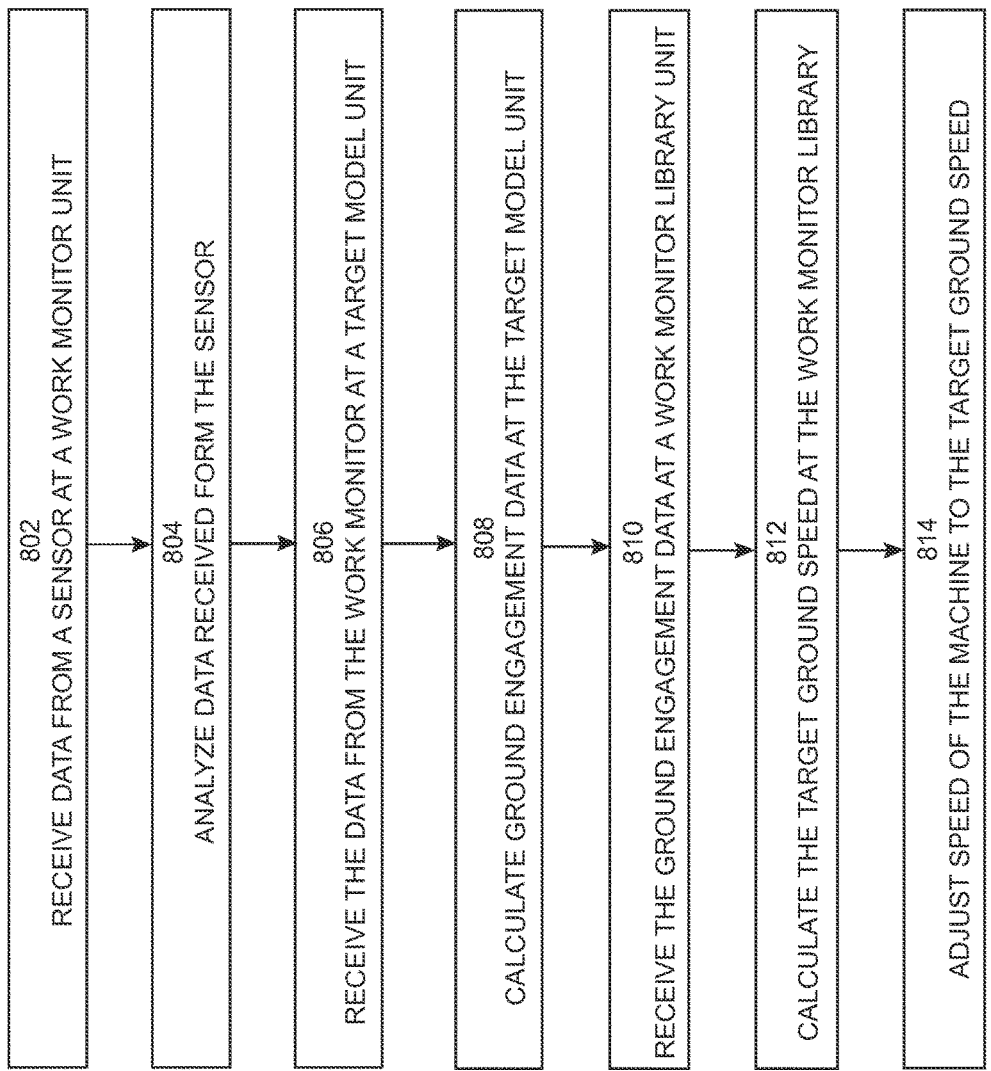
FIG. 8 illustrates a flow chart of a method performed by the units illustrated in FIG. 3 according to the disclosure.

FIG. 8 illustrates a flow chart of a method performed by the units illustrated in FIG. 3. At box 802, the work monitor unit 302 may receive the sensor data 402. At box 804, the work monitor unit 302 may analyze the received sensor data 402. At box 806, the target model unit 304 may receive the data from the work monitor unit 302. At box 808, the target model unit 304 may calculate ground engagement data for the machine 100. At box 810, the work monitor library unit 306 may receive the ground engagement data. At box 812, the work monitor library unit 306 may calculate the target ground speed 540. Once the target ground speed 540 has been calculated, the ECM may help adjust the actual speed of the machine 100 to the target ground speed 540. To adjust the speed of the machine 100, the ECM may adjust the load being applied to the machine 100 by adjusting the ground engaging implement, such as the blade.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for automatically adjusting a target ground speed of a machine, the method comprising:
    receiving, by one or more processors of an electronic control module of the machine, data from a plurality of sensors;
    analyzing, by the one or more processors, the data received from the plurality of sensors;
    calculating, by the one or more processors and based on the data, ground engagement data for the machine,
        wherein calculating the ground engagement data includes:
            calculating a target track pull and a target track speed,
                the target track pull and the target track speed being calculated based on information identifying properties of a material on which the machine is operating, including a slope, a side slope, and a temperature of the material on which the machine is operating;
    calculating, by the one or more processors, the target ground speed based on the ground engagement data; and
    adjusting, by the one or more processors, a speed of the machine to the target ground speed by adjusting an implement on the machine to adjust an amount of load being applied to the machine.

2. The method of claim 1, further including:
    transmitting the target track pull and the target track speed to a track slip model unit in a work monitor library unit.

3. The method of claim 2, wherein calculating the ground engagement data includes calculating, with a target operating model unit, the target track pull and the target track speed based on an adjusted track pull and an adjusted track speed received from a driveline model unit, and wherein the track slip model unit also receives material properties from the one or more processors.

4. The method of claim 1, wherein calculating the ground engagement data includes calculating an adjusted track pull and an adjusted track speed with a driveline model unit and transmitting the adjusted track pull and the adjusted track speed from the driveline model unit to a target operating model unit.

5. The method of claim 4, wherein calculating the ground engagement data includes calculating, with the driveline model unit, the adjusted track pull and the adjusted track speed based on a converter torque and a converter speed received from a torque converter model unit.

6. The method of claim 1, wherein calculating the ground engagement data includes calculating a converter torque and a converter speed with a torque converter model unit and transmitting the converter torque and the converter speed from the torque converter model unit to a driveline model unit.

7. The method of claim 6, wherein calculating the ground engagement data includes calculating, with the torque converter model unit, the converter torque and the converter speed based on an engine torque and an engine speed received from an engine model unit.

8. The method of claim 1, wherein calculating the ground engagement data includes calculating an engine torque and an engine speed with an engine model unit and transmitting the engine torque and the engine speed from the engine model unit to a torque converter model unit.

9. The method of claim 8, wherein calculating the ground engagement data includes calculating, with the engine model unit, the engine torque and the engine speed based on a constant track pull curve and a maximum torque converter absorption curve received from another torque converter model unit.

10. The method of claim 1, wherein calculating the ground engagement data includes generating a constant track pull curve and a maximum torque converter absorption curve with a torque converter model unit and transmitting the constant track pull curve and the maximum torque converter absorption curve from the torque converter model unit to an engine model unit.

11. The method of claim 10, wherein calculating the ground engagement data includes generating, with the torque converter model unit, the constant track pull curve and the maximum torque converter absorption curve based on a converter torque received from a driveline model unit.

12. The method of claim 1, wherein calculating the ground engagement data includes calculating a converter torque with a driveline model unit and transmitting the converter torque from the driveline model unit to a torque converter model unit, and wherein calculating the ground engagement data includes calculating, with the driveline model unit, the converter torque based on a raw target track pull received from a work monitor unit and based on gear information.

13. The method of claim 1, wherein analyzing the data received from the plurality of sensors comprises determining a raw target track pull and a raw target track speed with a performance optimization algorithm unit,
    wherein determining the raw target track pull and the raw target track speed is based on the data received from the plurality of sensors, and
    wherein the data received from the plurality of sensors includes the information identifying properties of the material on which the machine is operating.

14. A method for automatically adjusting a target ground speed of a machine, the method comprising:
    receiving, by one or more processors of an electronic control module of the machine, data from one or more sensors;
    analyzing, by the one or more processors, the data received from the one or more sensors, wherein at least one of the one or more sensors is configured to determine a surface on which the machine is operating and to estimate material properties of the surface on which the machine is operating, including a temperature and either a slope or a side slope of the material on which the machine is operating, and wherein analyzing the data received from the one or more sensors includes determining a raw target track pull and a raw target track speed based on the material properties of the surface on which the machine is operating;

calculating, by the one or more processors and based on the data, ground engagement data for the machine based on the determined raw target track pull and the determined raw target track speed, wherein calculating the ground engagement data includes calculating a ground speed and calculating a track slip, calculating, by the one or more processors and based on the ground engagement data, a target track pull and a target track speed, wherein the target track pull and the target track speed are calculated based on the material properties of the surface on which the machine is operating;

calculating, by the one or more processors, the target ground speed based on the ground engagement data and based on whether the target track speed is less than or equal to the raw target track speed or whether the target track speed is greater than the raw target track speed; and adjusting, by the one or more processors, a speed of the machine to the target ground speed.

15. The method of claim 14, wherein calculating the ground engagement data includes calculating an adjusted track pull and an adjusted track speed with a driveline model unit and transmitting the adjusted track pull and the adjusted track speed from the driveline model unit to a target operating model unit; and wherein calculating the ground engagement data includes calculating, with the driveline model unit, the adjusted track pull and the adjusted track speed based on a converter torque and a converter speed received from a torque converter model unit.

16. The method of claim 14, wherein adjusting, by the one or more processors, the speed of the machine to the target ground speed includes adjusting an implement on the machine to adjust an amount of load being applied to the machine.

* * * * *